Dec. 4, 1956 L. W. PARKER 2,773,119

TUNING SYSTEM FOR RADIO AND TELEVISION RECEIVERS

Filed April 4, 1950 3 Sheets-Sheet 1

INVENTOR
LOUIS W. PARKER
BY Geo. J. Hyde
ATTORNEY

Dec. 4, 1956 L. W. PARKER 2,773,119

TUNING SYSTEM FOR RADIO AND TELEVISION RECEIVERS

Filed April 4, 1950 3 Sheets-Sheet 2

INVENTOR
LOUIS W. PARKER
BY Geo. J. Hyde
ATTORNEY

TUNING SYSTEM FOR RADIO AND TELEVISION RECEIVERS

Filed April 4, 1950

3 Sheets-Sheet 3

INVENTOR
Louis W. Parker.
BY Geo. G. Hyde
ATTORNEY 2,773,119

TUNING SYSTEM FOR RADIO AND TELEVISION RECEIVERS

Louis W. Parker, Little Neck, N. Y.

Application April 4, 1950, Serial No. 161,279

19 Claims. (Cl. 178—5.8)

This invention relates to a tuning system for radio and television receivers, and particularly for such receivers which have a tuned circuit with a relatively wide pass band. This condition is found in receivers for frequency modulated carrier waves, and in television receivers, especially where the vestigial side band system of transmission is used.

The invention is particularly advantageous for television receivers which employ the intercarrier circuit. This circuit, which is disclosed in the present inventor's Patent No. 2,448,908, preferably employs a superheterodyne circuit having a single I. F. amplifier for both the AM video carrier and the FM audio carrier, the output of the second detector including a beat frequency produced by the carriers that is frequency modulated by the audio signals. This beat frequency passes through a selector and limiter to the usual discriminator, amplifier and loud speaker circuits for the audio signals.

The acceptance of the I. F. amplifier in this circuit is made sufficiently broad, in order to pass the video and audio bands, so that when the receiver is tuned to a station the tuning may be varied considerably without changing the volume from the loud speaker; and accurate tuning therefore depends on observation of the picture quality. This arrangement is subject to certain drawbacks. It is difficult to detect poor picture quality when certain types of pictures are received; too much dependence is placed on the operator's judgment and care, which are subject to wide individual variations; and picture quality is not sharply peaked, but varies gradually in the neighborhood of correct tuning, requiring care and close attention to get the best results.

The same problem is present in intercarrier television receivers which employ a common tuned radio frequency circuit for amplification of both the video and the audio carriers, since the acceptance of the TRF circuit must be broad enough to pass both carriers. It is also present in receivers for frequency modulated carriers, since the amplification circuit must have sufficiently broad acceptance to pass all frequencies within the modulation range of a carrier without distortion.

A general object of the invention is to provide a novel tuning system for television receivers that is not dependent on observation of picture changes, and which has a sharply peaked response to tuning. One purpose is to provide such a tuning system that is adapted to operate in substantially the same manner as standard radio tuning systems, so that prospective television receiver purchasers will not be deterred by strange tuning devices. The invention facilitates the practical and effective use of continuous tuning arrangements having control knobs similar in appearance and operation to those on radio receivers.

Another purpose is to provide an improved tuning system for television receivers employing the intercarrier system which will operate with greater speed, accuracy and convenience.

More specific objects are to furnish a visual indication of correct picture tuning, such as a tube of the "tuning eye" type; an audible indication by producing a sharp peak of sound volume when tuning is correct; and a combination of these two types of indicators.

Another purpose of the invention is to provide a tuning indicator circuit that can be used when FM broadcasts of sound alone are being received. This is applicable both to receivers of FM broadcasts alone, and to television receivers that have a special circuit for FM broadcast reception. In the latter instance a specific feature is the provision of a tuning circuit arrangement that uses the same main circuit elements for both television and sound broadcast reception.

A further important object is to furnish a tuning indicator system that is relatively simple and inexpensive, and which can be incorporated in existing television circuits without extensive changes.

These and other objects and advantages will appear from the following description of a preferred embodiment of the invention, in conjunction with the accompanying drawings, in which.

Figure 1:
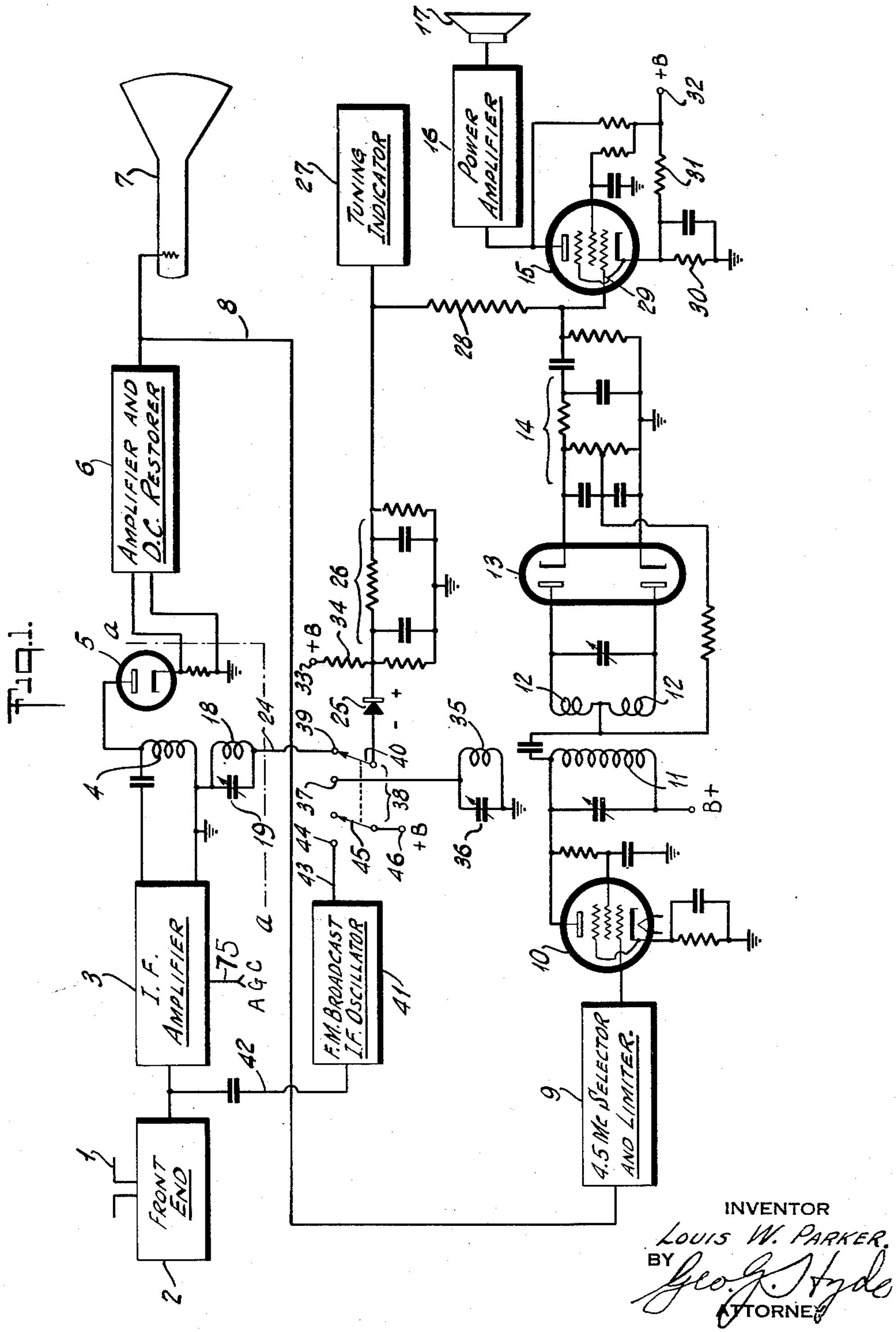
Fig. 1 is a diagram of a television receiver circuit employing the intercarrier system, with superheterodyne amplification, and embodying the invention, including an inductively coupled indicator circuit.
Figure 2:
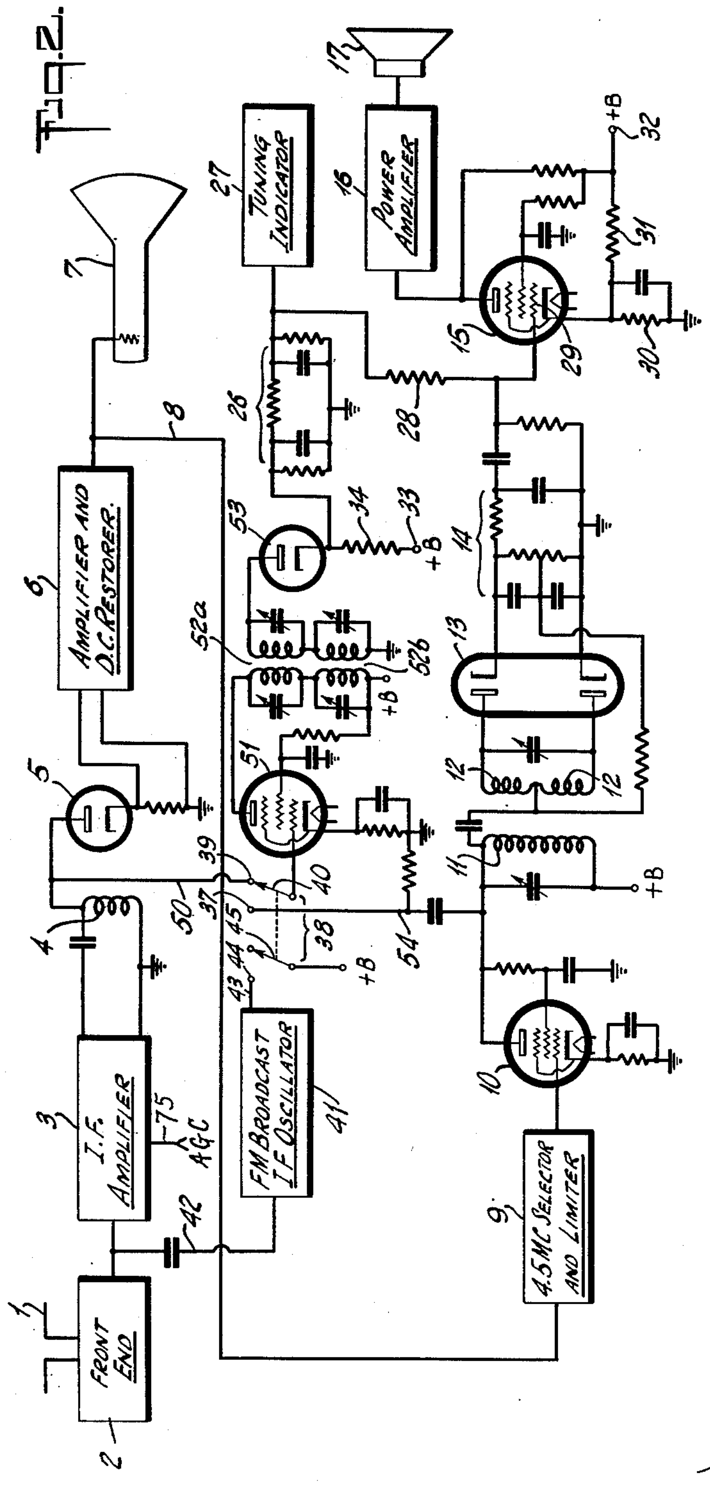
Fig. 2 is a similar diagram, showing buffer amplifier coupling of the indicator circuit.

The invention is illustrated in Figs. 1 and 2 by its use in a television receiver of the superherterodyne type employing the intercarrier circuit. Since this circuit is well known and has been extensively described in publications, only the portions pertinent to this invention are shown in detail.

In the form illustrated in Fig. 1 the incoming signals picked up by antenna 1 pass through the conventional front end 2 of a television receiver, having the usual tuning controls, to the I. F. amplifier 3, which transmits them through a coupling system including coil 4 to video detector 5, from which they pass through video amplifier and D. C. restorer 6 to picture tube 7. The FM audio signals, carried by the beat frequency, are taken off by lead 8 and pass through selector and limiter circuit 9 terminating in pentode 10, discriminator input coil 11, output coils 12, rectifier 13, filter 14, amplifier tube 15 and power amplifier 16 to loud speaker 17, in accordance with well known practice.

At the input end of the indicator circuit is a coil 18 coupled to an inductance in the I. F. amplifier, such as output coil 4, and tuned by condenser 19 to a frequency that will produce the maximum pickup by the indicator circuit when the front end 2 is correctly tuned to an incoming picture carrier.

Figure 3:
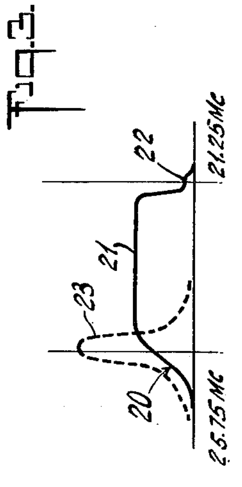
Fig. 3 is a graph of the acceptance curves of the receiver I. F. circuit and of the indicator circuit.

The invention is illustrated in its application to the vestigial side band receiver described in the abovementioned patent. In a receiver of this type, as indicated in Fig. 3, the video carrier intermediate frequency is located at about the midpoint of the slope 20 at the high frequency end of the acceptance curve 21 of the I. F. amplifier at its output end, the amplifier being designed to provide maximum amplification for the lower side band. At its other end curve 21 drops sharply to the audio carrier frequency 22, described in said patent. Under the system now in force in the United States the audio and video carrier frequencies are spaced by 4.5 mc.; and in the illustrated I. F. amplifier the audio intermediate frequency is 21.25 mc. and the video intermediate frequency is 25.75 mc.

The circuit 18—19 is tuned to substantially the correct video I. F. carrier frequency, and its acceptance curve is sharply peaked, especially since coils 4 and 18 are advantageously coupled so that a minimum of energy is extracted from the main circuit by the indicator circuit. This coupling must be loose enough so that it does not appreciably affect the selectivity curve. It has been found that for greatest tuning precision with the illustrated side band system, the indicator input circuit 18—19 should be tuned to a frequency very slightly below the correct video intermediate frequency, the difference being only of the order of 0.1 mc. under standard conditions. This precise tuning setting can best be obtained empirically, as by tuning variable condenser 19, adjusting it for maximum input into the indicator circuit when the correct video carrier frequency is passed through the I. F. amplifier. However, this is a tuning refinement that is not absolutely necessary to satisfactory operation, and is intended to be included in the description of input circuit 18—19 as substantially tuned to the video intermediate carrier frequency.

Coil 18 is connected by lead 24 to the negative side of rectifier 25, which may be a crystal or other suitable type. The rectifier output passes through a filtering and attenuating network 26 to tuning indicator 27. This may be a tube of the well-known "tuning eye" type, such as tube type 1629, in a suitable circuit. This type of tube has a visible target with a luminous arc varied in extent by changes in tuning, and for convenience will be referred to herein as a tuning eye tube. It should be noted, however, that in the present instance, since positive control potential is supplied to the tube, it will operate in reverse, with the maximum gap between the ends of the luminous arc when tuning is correct. The rectified output will not vary with changes in picture content since the rectifier operates only on synchronizing signal peaks, as would a peak voltmeter. The manner in which this is accomplished will be described later.

The output of network 26 is also applied through resistor 28 to the control grid 29 of audio amplifier tube 15. This grid is biased, relative to the cathode, to a negative bias substantially more negative than the correct value for optimum amplification, resulting in a low level of sound output and weak signals from loud speaker 17. This bias may be produced in various ways. In the form illustrated, in addition to the use of biasing resistor 30 in the cathode circuit, an appropriate positive potential is applied to the cathode, as by connecting the cathode through resistor 31 to a positive potential source, which advantageously is the usual plate potential source 32.

The bias potential of grid 29 is selected so that, when the maximum current flows in the indicator circuit, the resulting positive potential applied by the latter circuit to grid 29 will raise the grid potential to the correct value for optimum audio amplification. Although in the illustrated embodiment the fixed grid bias, and the variable grid bias from the indicator circuit, are shown as applied to the same grid of the tube 15, which has only one operative control grid, the invention in its broader aspects is not limited to this arrangement or to the type of tube shown, since similar results can be obtained by utilizing multiple control grids of a suitable tube, such as type 6L7.

The indicator circuit includes an arrangement which maintains the sound volume at a steady level during tuning. In the form shown, this arrangement applies to the output of rectifier 25 a D. C. potential whose value is higher than that produced by undesirable sound signals, such as side band frequencies and noises, but of course substantially lower than the channel tuning peaks 23. This procedure is sometimes described as introducing a delay factor or delay bias; but it should be understood that the term does not refer to a time delay in such cases. In the illustrated circuit the result is obtained by connecting the output of rectifier 25 to a source of positive potential 33, which may be the plate potential source connected through a suitable dropping resistor 34.

The operation of the system as thus far described is as follows: When the receiver is being tuned to the frequency of a desired channel the indicator circuit is not affected until the front end 2 is tuned sufficiently close to the correct setting so that the incoming signals are carried by an intermediate frequency within the pass band of amplifier 3, a picture of some type appears on the screen of tube 7, and sound is heard from speaker 17. Tuning indicator 27 may indicate reception of such signals; but owing to the peaked characteristic 23 of the indicator circuit, the D. C. voltage applied to indicator 27 and grid 29 will be so low that neither the visual indication nor the sound volume will be materially affected until the tuning approaches closely to the correct value. Upon such approach the sound volume will rise sharply, the width of the dark gap in the tuning eye tube will change noticeably, and when tuning is precisely correct, slight changes in either direction will cause a noticeable drop in sound volume and a substantial change in the appearance of the indicator 27. The operator will therefore tune to a well-defined peak of sound, to a definite indicator position, or to both, without the necessity of judging picture quality.

This type of operation can be obtained with tuning controls of any desired type devoted solely to tuning the front end to the correct wave length, and eliminates the need for special types of tuning heretofore used in television receivers. It is pointed out that with this system the tuning affects the volume of sound, not its quality, which is harder to judge.

It should also be noted that, while the sides of curve 23 are steep, it will be sufficiently broad at the top to permit the oscillator-generated frequency in the front end 2 to drift considerably without producing any noticeable change in the sound or the picture. Such a drift generally occurs as the set warms up; and the width of the top of curve 23 between the steep sides is sufficient to eliminate the need for retuning after initially tuning to the right setting.

While both a visual indicator 27 and a sound volume varying arrangement are shown, and can be used in combination as in many radio receivers, it will be evident that either type of tuning indication may be used alone, either by omitting the indicator 27 or by eliminating the connections through resistors 28 and 31 to tube 15.

Television receivers are frequently arranged to receive FM sound broadcasts without pictures; and when the intercarrier circuit is used it is necessary to employ an additional oscillation generating circuit to provide a carrier which replaces the video carrier and produces the beat carrier for the sound. Since the carrier for the generating circuit does not vary in frequency during tuning, the previously described indicator circuit is ineffective for reception of sound broadcasting.

As already noted, a feature of the invention is the provision of a circuit that overcomes this difficulty; and a specific feature is the utilization of the major part of the television indicator circuit heretofore described, for FM sound broadcast tuning indication. This is accomplished in general by providing a second pickup circuit coupled to the audio circuit of the television receiver, where the frequency is of course varied by the tuning, and substituting the second pickup circuit for the pickup circuit described above, when the receiver is switched to FM sound broadcast reception.

This is illustrated in Fig. 1, in which a second pickup coil 35 is inductively coupled to a coil in the audio circuit, such as discriminator input coil 11, and is tuned to the audio carrier frequency by shunt condenser 36. A switching arrangement is provided for substituting coil 35 for coil 18 in the input circuit to rectifier 25 when the oscillation generating circuit for FM sound broadcast reception is switched on. In the embodiment shown, coil 35 is connected to point 37 of double pole double throw switch 38, whose point 39 is connected through lead 24 to pickup coil 18; and switch arm 40, which contacts said points alternatively, is connected to the input of rectifier 25. An oscillator 41, which generates the video carrier intermediate frequency wave (25.75 mc. in the example given), has an output lead 42 connected to the input of the I. F. amplifier 3, and a plate potential lead 43 connected to point 44 of switch 38, engaged by switch arm 45, connected to source 46 of plate potential, when the switch 38 is in left hand or sound broadcast receiving position, with arm 40 contacting point 37.

With this arrangement oscillator 41 is inactive when switch 38 is in right hand or television receiving position, and is energzed when the switch is thrown to the left, simultaneously with the substitution of the coil 35 for coil 18 in the indicator circuit input. This arrangement therefore utilizes the main portion of the indicator circuit for both types of reception.

It may be desirable in some cases to avoid the effects of inductive coupling of the indicator circuit to the main circuit, as shown in Fig. 1; and a similar circuit, using conductve coupling and a buffer tube, is illustrated in Fig. 2. The circuit is largely the same as the one previously described, and corresponding parts are indicated by the same numerals. In this embodiment switch point 39 is connected by lead 50 to the output of amplifier 3 through coil 4. Switch arm 40 is connected to the control grid of buffer tube 51, whose output is fed through a tuned output transformer to the indicator circuit rectifier. In the form illustrated the transformer comprises two tuned sections 52*a* and 52*b* in series, tuned respectively to the video carrier intermediate frequency in amplifier 3, and to the audito carrier frequency at the output of tube 10. With this arrangement either of these frequencies will be passed with low impedance, while other frequencies will be effectively blocked. It should be understood that, although the illustrated embodiment employs a simple, practical tuned transformer arrangement in Fig. 2 which eliminates the need for switching at this point, the showing is not intended to be restrictive or limiting.

It will be noted that the rectifier in Fig. 2 is shown as a diode; but this is done simply to illustrate the fact that different rectifiers can be used in both Fig. 1 and Fig. 2, whose requirements are the same. Likewise, while switch point 37 is shown as connected through lead 54 to the input coil 11 of the discriminator, it will be apparent that this likewise is illustrative and not restrictive.

The operation of the Fig. 2 circuit is substantially the same as that previously given for Fig. 1. Since leads 50 and 54 draw no current, this arrangement does not affect the operation of the main television circuit.

Figure 4:
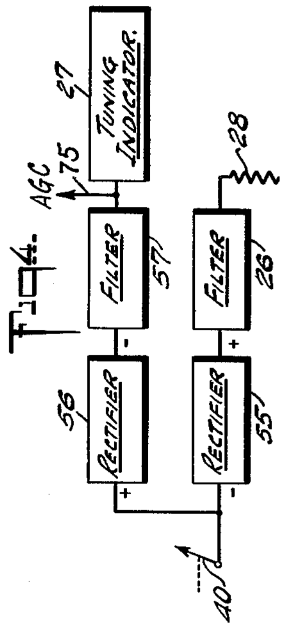
Fig. 4 is a diagram of a modification of the indicator circuit.

It has been pointed out that with the circuits heretofore described, when a tuning indicator employing a tuning eye tube is used, it will operate in reverse fashion, since the control potential from the indicator circuit is positive. While this arrangement will operate satisfactorily, there is some advantage in having the tube operate in conventional fashion. This may be accomplished by modifying the control circuit to provide a negative control potential; and one arrangement of this type is illustrated in Fig. 4. It includes separate circuits for the visual indicator 27 and for the sound indicating arrangement including tube 15, both connected to the same pickup through switch arm 40. The sound circuit is the same as that previously described, including rectifier 55, filter 26 and resistor 28, connected as in Figs. 1 and 2. A separate visual indicator circuit is also connected to switch arm 40, and includes a second rectifier 56, connected with its positive side toward arm 40 and the input, so that the negative side is connected through filter 57, which may be the same as filter 26, to the visual tuning indicator 27, where it controls the operation of the tuning eye tube in conventional manner.

The same D. C. potential may also be used for automatic gain control of the I. F. amplifier. Lead 75 connected to the output of filter 57 conducts the negative control potential to the I. F. amplifier grids in the conventional manner. The control voltage does not vary appreciably with changes in picture content because the diode operates on synchronizing pulses, as would a peak voltmeter.

Figure 5:
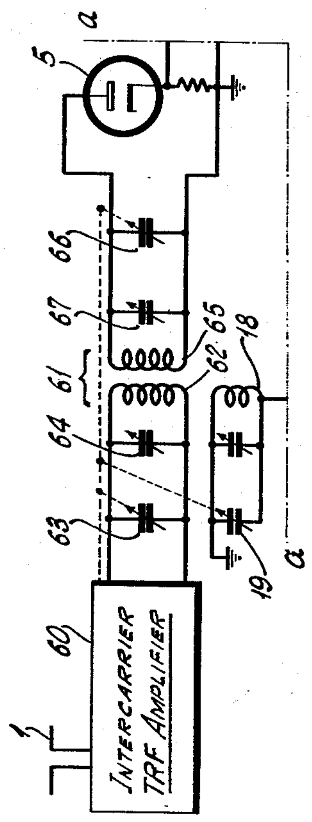
Fig. 5 is a diagram of a modification of the initial portion of the circuit shown in Fig. 1 up to the line *a—a*, illustrating the application of the invention to such a circuit employing tuned radio frequency amplification.

As already indicated, the invention is advantageous for television receivers employing a tuned radio frequency intercarrier amplification section. This embodiment is illustrated in Fig. 5. Parts common to Figs. 1 and 5 are designated by the same numerals, and as the portions of the circuits of these figures following line *a—a* are the same, this portion is not included in Fig. 5.

The circuit of the amplifier 60 is well known, being shown in standard publications and therefore is not illustrated in detail. The last amplifier stage includes the usual output transformer 61, with primary 62 shunted by tuning condenser 63 and trimming condenser 64, and secondary 65 connected to the detector tube 5 and shunted by tuning condenser 66 and trimming condenser 67. All of these condensers are of course variable; and the tuning condensers 63, 66 are ganged with other tuning condensers in amplifier 60 in accordance with standard practice.

The indicator circuit input coil 18 is inductively coupled to primary coil 62, and the variable condenser 19 which tunes coil 18 is ganged with condensers 63 and 66. Coil 18 and condenser 19 are designed and arranged to maintain a substantially uniform difference of 2 megacycles between the frequencies to which coils 62 and 65 are tuned, throughout the tuning range. This is due to the vestigial system of transmission of television signals, which places the picture carrier about 2 mc. away from the middle of the band. It has been found in practice that the frequencies to which these coils are tuned do not vary during tuning at precisely the same rate, so that the frequency difference will vary slightly at different points in the tuning range. It has been found that by adjusting the inductance of coil 18 and the capacity of its trimmer condenser the desired difference can be obtained at the upper and lower limits of said range, and the variations at intermediate frequencies will be negligible.

The operation of this embodiment is apparent from from the foregoing description.

While the invention has particular value when applied to television receivers, especially those using the intercarrier system, it is also applicable to other circuits which present a similar problem of obtaining precise tuning when the tuned circuits have a relatively broad pass band. This condition is present in receivers of frequency modulated valves, in which the pass band must be wide enough to pass the entire range of modulation frequencies without distortion. Such receivers require care and accurate aural judgment in order to tune them correctly to a setting at which neither the highest nor the lowest modulation frequencies are distorted. The present invention substitutes simple judgment of sound volume, of the visual indicator position, or of both, for judgment of slight changes in sound quality.

Figure 6:
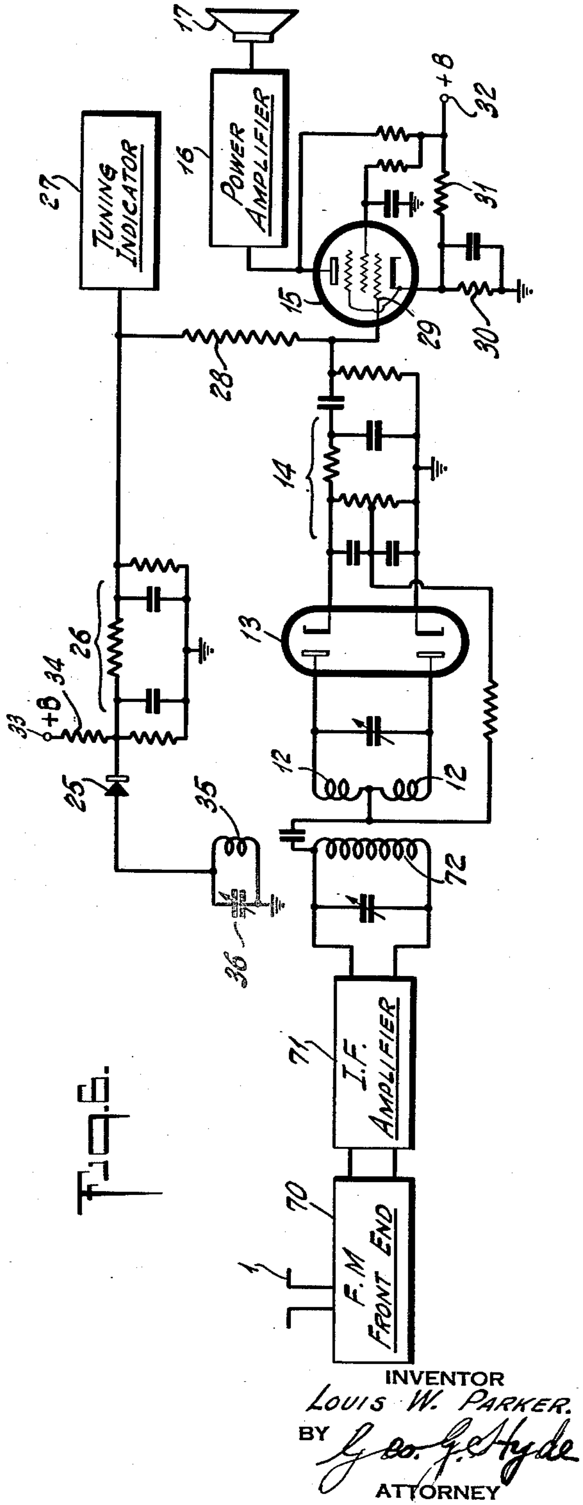
Fig. 6 is a diagram of an FM broadcast receiver circuit embodying the invention.

A circuit of this type is shown diagrammatically in Fig. 6, which illustrates an FM receiver having the usual front end 70 and I. F. amplifier 71, since superheterodyne amplification is generally used in such receivers. Amplifier 71 terminates in the primary 72 of a discriminator, which is inductively coupled to the indicator circuit input coil 35, tuned by condenser 36 and connected to rectifier 25. Since the latter parts and the remaining elements of the circuit have the same arrangement and functions as similar parts and elements in the indicator system operated by the audio circuit as shown in Fig. 1 and described above, they are designated by the same numerals, and further description of the operation of this embodiment is not necessary. Coil 35 is tuned to the intermediate frequency in amplifier 71; and when the front end 70 is accurately tuned to the desired carrier wave length, so that the entire range of modulation frequencies is passed without distortion, that fact will be clearly indicated by sound volume and by indicator position, as already noted.

For simplicity, only the inductive type of input coupling of the indicator circuit has been shown in Figs. 5 and 6; but this showing is not intended to be construed as a limitation to this type of coupling, especially since the conductive type has been illustrated in Fig. 2. It is also evident that the modification shown in Fig. 4 is applicable to Figs. 5 and 6.

While a specific embodiment of the invention and certain variations have been described, it will be evident that the invention is not limited to the particular arrangements shown. It can be applied by electronic engineers in the light of this disclosure to a wide variety of circuits, and particularly television circuits, that have been and will be hereafter disclosed. While it has special and unexpected advantages when used with the intercarrier circuit, it includes features that are applicable to other circuits. Although its use with the vestigial side band system has been described, since it conforms to present preferred practice, and is particularly advantageous for this system, the invention in its broader aspects is not limited to such use. Likewise, the invention is not limited to circuits employing a discriminator.

The specific disclosure therefore is not intended to limit the invention to the particular embodiments described, except as indicated in the claims.

I claim:

1. A television receiver of the vestigial side band type for receiving a video modulated carrier having a portion of one video side band removed and having a frequency modulated audio channel operating just beyond the limit of the other video side band, comprising in combination, tunable means for receiving the modulated radio waves and producing a radio frequency signal having a band of modulations thereon conforming substantially to those on the received waves, a detector for rectifying the output of said means, means responsive to the video signals existing in the output of said detector for displaying a picture, a selector connected to the output of said detector for selecting the frequency modulated audio signals, a frequency discriminator fed by the output of said selector, an audio amplifier fed by said frequency discriminator, selective means connected to said first-named means and sharply peaked as compared to the band width of the video modulated signals, said selective means being peaked at a frequency within the band of the video signals near the end thereof opposite that which carries the audio modulation, and tuning indicator means responsive to the output of said selective means for increasing the gain of said audio amplifier to increase the output thereof when said selective means is fed with signals at its resonant frequency.

2. A television receiver as defined in claim 1, in which said tunable means and said selective means are inductively coupled to each other.

3. A television receiver of the vestigial side band type for receiving a video modulated carrier having a portion of one video side band removed and having a frequency modulated audio channel operating just beyond the other video side band, comprising in combination, means tunable over a range of frequencies inclusive of those of the signals to be received for producing a radio frequency signal having a band of modulations thereon conforming substantially to those on said received waves, said means including an element for passing said radio frequency signals, said element having at its upper end an acceptance curve which includes a small portion of said first side band and which is rising as it crosses from the last-named to the remaining side band, said acceptance curve including at its other end the frequency modulated audio signal modulations, a detector for detecting the output of said element, means amplifying the detected output and utilizing it for producing a picture, a selector for extracting the frequency modulated audio signals from the detected energy, selective means peaked to a frequency on the said rising portion of said curve, the selective means being sharply peaked as compared to the width of the video modulations and being connected to the first-named means and energized by said radio frequency signal, and means energized by said selective means for producing a signal indicative of the tuning adjustment of said receiver and useful to effect accurate tuning thereof to a received signal.

4. A television receiver as defined in claim 3 in which said tunable means is a tuned radio frequency amplifier producing said radio frequency signal in its output, said tunable means having a variable tuning member, said selective means comprising a tuned resonant circuit having a variable tuning member ganged with the first-named tuning member in such relation that the frequency of the selective means remains on the said rising portion of the acceptance curve of the tunable means.

5. A television receiver as defined by claim 3, in which said tunable means is a radio receiver of the superheterodyne type, said element being a part of an intermediate frequency amplifier stage, said selective means being connected to an intermediate frequency amplifier and being responsive to the modulated intermediate frequency signal.

6. A television receiver as defined by claim 5 in which said means controlled energized by said selective means comprises all of the following parts: an audio amplifier coupled to the output of said selector and including a control grid for controlling the gain, a tuning eye, a first series circuit including a rectifier and filter for connecting the output of said selective means to said grid, and a second series circuit including a rectifier and filter for connecting the output of said selective means to said tuning eye.

7. In a television receiver, signal producing means comprising an input circuit for passing a band of frequencies wide enough to include both the video and sound modulations, said circuit including tuning means for varying the frequency of reception, and a detector coupled to the output of said circuit; means coupled to the output of said detector for producing a picture conforming to the video modulation detected; means for separating the audio modulations in the output of said detector and for amplifying the same; an electron discharge device having a grid; means connecting said grid to said input circuit; a tuned circuit in the output circuit of said discharge device; said tuned circuit being tuned to a frequency within said band and being sharply peaked as compared to the width of said band, and tuning indicating means responsive to the potential across said tuned circuit for effecting an indication useful in tuning the receiver which varies with said potential.

8. A television receiver as defined in claim 7 in which the tuning indicating means includes means for increasing the degree of amplification of the audio modulations as the signals reaching said tuned circuit approach its resonant frequency.

9. In a television receiver of the tuned radio frequency type, an input circuit for producing in its output a band of frequencies with the carrier frequency closely adjacent one end of the band and including tuning means for varying the frequency of reception, the tuning means having a mechanically variable element operable to control the frequency of reception; audio means for extracting from said band of frequencies any audio modulation existing in said band adjacent the other end thereof, means for extracting from said band of frequencies any video modulations, selective means peaked in said band for developing a signal depending on the amplitude of the signals in said band, said selective means including a tuned resonant circuit having a mechanically variable element for adjusting the frequency thereof, and means ganging said mechanically variable elements together in such relation that the tuned resonant circuit is tuned to said carrier frequency in said band when the tuning means is adjusted to allow the whole band to readily pass, tuning indicator means, and control means responsive to said selective means for controlling the degree of indication given by said tuning indicator means in response to variations in the output of said selective means.

10. A television receiver as defined in claim 9 in which said indicating means is a loudspeaker, said control means including means for increasing the amplitude of the signal output of the audio means when the output of the selective means increases.

11. A television receiver as defined in claim 9 in which said indicating means is a tuning indicator connected to the output of said selective means.

12. In a television receiver, an input circuit for producing in its output a limited band of frequencies and including tuning means for varying the frequency of reception, audio means for extracting from said band of frequencies any audio modulation existing in said band adjacent one end thereof, and means including a tuned circuit sharply peaked at a frequency in said band adjacent the other end thereof for increasing the amplitude of the output of said audio means when the current in the sharply tuned circuit increases.

13. A radio receiver for receiving a wave which has a carrier having a wide band of modulations on it together with an additional audio modulated signal the frequency of which varies within limits outside of said wide band, comprising in combination, tunable input means for producing in its output a radio frequency signal having both of said modulations on it, a detector for rectifying the output of said input means, a selector for passing said additional modulations, an amplifier for amplifying the output of said selector, selective means sharply peaked as compared to the width of said wide band and connected to said input means, said input means having an acceptance band just broad enough to include both of said modulations and the selective means being peaked to a frequency corresponding to the carrier frequency of said radio frequency signal when the tunable means is tuned to optimum position, and tuning indicating means controlled by said selective means for increasing the gain of said amplifier with increase in the output of said selective means.

14. In a television receiver for a television system in which a picture signal carrier is amplitude modulated and the complemental sound signal is transmitted as a frequency modulation of a second carrier, in combination, an amplifier, means for supplying said picture and sound carriers of a television signal to said amplifier, a detector supplied by said amplifier, and a selecting circuit connected between said amplifier and said detector and having a frequency characteristic such that both picture and sound carriers are passed to said detector, the two carriers being heterodyned with each other in the detector, means in the selecting circuit for modifying the characteristics of that circuit so that it is characterized by substantially zero slope over the range of frequency swing of the sound carrier and has an amplitude level below the minimum modulated amplitude of the amplitude-modulated picture signal carrier, whereby the output from said detector contains both detected video signals and undetected frequency modulated audio signals, and a detector responsive to the undetected signals to produce the audio signals, resonant means connected to said amplifier and peaked sharply to the picture signal carrier frequency in the output of said amplifier, and means for indicating the amplitude of the current flow in said resonant means.

15. In a television receiver for receiving a television signal band consisting of an amplitude modulated video signal carrier and a related frequency modulated audio signal carrier, the two carriers being separated by a substantially fixed frequency difference, in combination, a selecting circuit adapted to be supplied with said signal carriers, said selecting circuit including means to cause the circuit characteristic to be such that the picture and the sound carriers of the same television signal band, as accepted, are amplified in an amplitude ratio of the order of 20:1, with substantially zero amplitude change of the audio carrier with frequency change, means for heterodyning and detecting said carriers to produce both a detected video signal and an undetected frequency modulated audio carrier, resonant means peaked sharply to the picture carrier frequency appearing in the output of said selecting means, and means for detecting and amplifying the said undetected frequency modulated audio carrier, the last-named means including means for increasing its gain when the output of said resonant means increases.

16. A television receiver for receiving a television signal band including an amplitude modulated image carrier and a related frequency modulated sound carrier spaced a substantially fixed frequency from the picture carrier, said receiver comprising means to select and amplify one such band of frequencies so that the amplitude of the sound carrier will be less than the amplitude of the image carrier at the maximum modulation of that carrier by the picture or image signal, means for heterodyning said carriers to produce a new carrier having a frequency equal to the frequency spacing of the image and sound carriers and for amplitude detecting the image carrier to produce image signals, demodulating means energized in accordance with the new carrier for producing audio signals, a tuning eye, resonant means peaked to the image carrier appearing in the output of the first-named means and connected to such output, and a rectifier connecting said resonant means to the tuning eye.

17. A radio receiver for receiving a wave which has a carrier having a wide band of modulations on it together with an additional audio modulated signal the frequency of which varies within limits outside of said wide band, comprising in combination, tunable input means for producing in its output a radio frequency signal having both of said modulations on it, a detector for rectifying the output of said input means, a selector for passing said additional modulations, audio means responsive to the output of said selector, selective means sharply peaked as compared with the width of said wide band and connected to said input means, said input means having an acceptance band broad enough to include both of said modulations and the selective means being peaked to a frequency corresponding to the carrier frequency of said radio frequency signal when the tuning means is tuned to optimum position, and means controlled by said selective means for effecting an indication when the selective means is being fed with signals whose frequency corresponds to the resonant frequency of the selective means.

18. A radio receiver as defined in claim 17 in which the last-named means is a visual indicator separate from the audio means.

19. A radio receiver as defined in claim 17 in which the audio means comprises an audio amplifier and a loudspeaker fed thereby, the means for effecting an indication including means for controlling the gain of said audio amplifier.

References Cited in the file of this patent

UNITED STATES PATENTS

| | | |
|---|---|---|
| 2,023,458 | Yolles | Dec. 10, 1935 |
| 2,100,236 | Brown | Nov. 23, 1937 |
| 2,153,783 | Weyers | Apr. 11, 1939 |
| 2,160,566 | Schmidt | May 30, 1939 |

(Other references on following page)

UNITED STATES PATENTS

| | | |
|---|---|---|
| 2,173,173 | Lewis | Sept. 19, 1939 |
| 2,189,300 | Roberts | Feb. 6, 1940 |
| 2,190,435 | Roberts | Feb. 13, 1940 |
| 2,221,096 | Keall | Nov. 12, 1940 |
| 2,261,643 | Brown | Nov. 4, 1941 |
| 2,264,019 | Case | Nov. 25, 1941 |
| 2,285,857 | Hewel | June 9, 1942 |

| | | |
|---|---|---|
| 2,355,701 | Bradley | Aug. 15, 1944 |
| 2,451,584 | Stone | Oct. 19, 1948 |
| 2,501,416 | Smith | Mar. 21, 1950 |
| 2,528,222 | Foster | Oct. 31, 1950 |
| 2,632,800 | Schlesinger | Mar. 24, 1953 |

FOREIGN PATENTS

| | | |
|---|---|---|
| 358,271 | Italy | Apr. 11, 1938 |